US011518105B2

(12) United States Patent
Puigardeu Aramendia et al.

(10) Patent No.: US 11,518,105 B2
(45) Date of Patent: Dec. 6, 2022

(54) ADDITIVE MANUFACTURING

(71) Applicant: HEWLETT-PACKARD DEVELOPMENT COMPANY, L.P., Houston, TX (US)

(72) Inventors: Sergio Puigardeu Aramendia, Sant Cugat del Valles (ES); Adrien Chiron, Sant Cugat del Valles (ES); Daniel Pablo Rosenblatt, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 855 days.

(21) Appl. No.: 16/089,863

(22) PCT Filed: Mar. 29, 2017

(86) PCT No.: PCT/US2017/024767
§ 371 (c)(1),
(2) Date: Sep. 28, 2018

(87) PCT Pub. No.: WO2018/182594
PCT Pub. Date: Oct. 4, 2018

(65) Prior Publication Data
US 2020/0298496 A1    Sep. 24, 2020

(51) Int. Cl.
*B29C 64/393* (2017.01)
*B33Y 10/00* (2015.01)
(Continued)

(52) U.S. Cl.
CPC .......... *B29C 64/393* (2017.08); *B29C 64/165* (2017.08); *B33Y 10/00* (2014.12); *B33Y 30/00* (2014.12); *B33Y 50/02* (2014.12)

(58) Field of Classification Search
None
See application file for complete search history.

(56) References Cited

U.S. PATENT DOCUMENTS 8,456,523 B2 *  6/2013  Stork genannt Wersborg ............ B23K 26/046
                                                                    348/90
2008/0262695 A1  10/2008  Gibson et al.
(Continued)

FOREIGN PATENT DOCUMENTS

CN    102497952    6/2012
CN    105934332    9/2016
(Continued)

OTHER PUBLICATIONS

Corbin et al., "Temperature Calibration of an Additive Manufacturing Process-Monitoring Thermal Imaging System", Materials Science and Technology, Retrieved from Internet: http://www.programmaster.org/PM/PM.nsf/ApprovedAbstracts/3030E8BD3BBDB19385257E0A006F3CC0?OpenDocument, 2015, 2 pages.
(Continued)

*Primary Examiner* — Philip C Tucker
*Assistant Examiner* — Evan T Hulting
(74) *Attorney, Agent, or Firm* — HP Inc. Patent Department

(57) ABSTRACT

Examples of a method of operating an additive manufacturing system, a three-dimensional (3D) printing system and a non-transitory machine-readable medium are described. In an example, a build material is supplied to a print region of an additive manufacturing system. A temperature distribution, corresponding to a pattern, of at least a surface of the build material is generated. An image of the pattern is captured using a thermal sensor. Image data representative of the image of the pattern is compared with data representative of an expected position of the pattern. On the basis of the comparing, difference data indicative of a difference between a position of the thermal sensor during capture of the image and an expected position of the thermal sensor
(Continued)

associated with the expected position of the pattern is generated. Operation of the additive manufacturing system is controlled at least in dependence on the difference data.

20 Claims, 5 Drawing Sheets

(51) Int. Cl.
*B33Y 30/00* (2015.01)
*B33Y 50/02* (2015.01)
*B29C 64/165* (2017.01)

(56) References Cited

U.S. PATENT DOCUMENTS

| | | |
|---|---|---|
| 2012/0069193 A1 | 3/2012 | Ramegowda et al. |
| 2015/0100149 A1 | 4/2015 | Coeck et al. |
| 2016/0082668 A1 | 3/2016 | Perret et al. |
| 2016/0184893 A1 | 6/2016 | Dave |
| 2016/0236279 A1 | 8/2016 | Ashton et al. |
| 2016/0332374 A1* | 11/2016 | Nauka .................. B29C 64/165 |
| 2019/0255654 A1* | 8/2019 | Beckett ................ B23K 26/032 |
| 2020/0338817 A1* | 10/2020 | Murciego Rodriguez .................. B29C 64/205 |

FOREIGN PATENT DOCUMENTS

| | | |
|---|---|---|
| CN | 106061714 | 10/2016 |
| CN | 106515013 | 3/2017 |
| DE | 102015011013 | 2/2016 |
| WO | WO-2012037694 | 3/2012 |
| WO | 2015108546 A2 | 7/2015 |
| WO | 2016173668 A1 | 11/2016 |
| WO | 2016192748 A1 | 12/2016 |
| WO | 2016201390 A1 | 12/2016 |
| WO | WO-2017019102 A1 | 2/2017 |

OTHER PUBLICATIONS

Rangel et al., "3D Thermal Imaging: Fusion of Thermography and Depth Cameras", Conference: 2014 Quantitative InfraRed Thermography, Retrieved from Internet: http://qirt.gel.ulaval.ca/archives/qirt2014doi/papers/QIRT-2014-035.pdf, Apr. 30, 2014, 10 pages.

* cited by examiner

ADDITIVE MANUFACTURING

BACKGROUND

Some additive manufacturing systems, including those commonly referred to as "3D printers", build three-dimensional (3D) objects by depositing layers of a build material and using heat to selectively fuse the build material to form the object being printed. A thermal camera may be aimed at a print region in which the build material is deposited to record or monitor temperature information at an array of locations, which information can be used by various subsystems of the additive manufacturing system.

BRIEF DESCRIPTION OF THE DRAWINGS

Various features of the present disclosure will be apparent from the detailed description which follows, taken in conjunction with the accompanying drawings, which together illustrate features of the present disclosure, and wherein.

DETAILED DESCRIPTION

Figure 1:
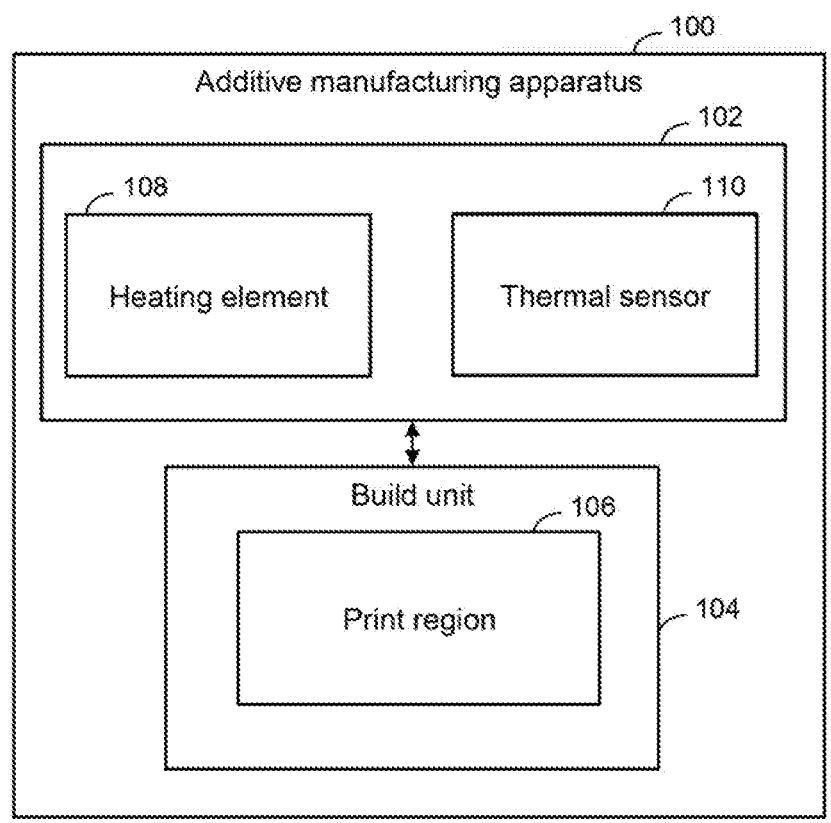
FIG. 1 is a schematic block diagram of an additive manufacturing system according to an example.

In the following description, for purposes of explanation, numerous specific details of certain examples are set forth. Reference in the specification to "an example" or similar language means that a particular feature, structure, or characteristic described in connection with the example is included in at least that one example, but not necessarily in other examples.

In an example additive manufacturing system, sometimes referred to as a three-dimensional (3D) printing system or an additive manufacturing apparatus, build material is deposited in layers in a working area. Chemical agents, referred to herein as "printing agents", are selectively deposited onto each layer within the working area. The printing agents may include a fusing agent and/or a detailing agent. The fusing agent may be selectively applied to a layer of the build material in areas where particles of the build material are to be fused together by subsequent application of energy, and the detailing agent may be selectively applied where the fusing action is to be reduced or controlled. For example, a detailing agent may be applied to reduce fusing at an object boundary to produce a part with sharp and smooth edges. Following the application of printing agents, energy, for example thermal energy, is applied to the layer. This fuses particles of build material according to the agents that have been applied. The process is then repeated for another layer, such that objects are built from a series of cross-sections. In other cases, one or other of the fusing agent and the detailing agent may be applied. For example, in some cases, a fusing agent may be selectively applied to regions of a layer of build material which are to be fused. In another example, a detailing agent may be selectively applied to regions of a layer of build material that are not to be fused.

Additive manufacturing systems may include different units. An example of an additive manufacturing system includes a unit comprising a thermal sensor, such as a thermal camera or a thermal image capture device, sometimes referred to as a thermographic camera. Such a thermal sensor can be used to capture an image by detecting near-infrared radiation or infrared radiation to produce an image in which the color or greyscale distribution of the image is indicative or representative of the temperature distribution of the scene captured in the image.

A thermal sensor of an additive manufacturing system in examples is aimed at the working area, which may be referred to as the print region. The thermal sensor can therefore be used to capture images indicating the temperature of the print region. These images can be used to determine the temperature of certain coordinates, positions or regions of the print region, for example an array of locations in the print region. The calculated temperature of the print region can be used to control other subsystems of the additive manufacturing system. For example, the power of a heating subsystem for applying thermal energy to the build material or the levels of one or more printing agents may be adjusted dynamically based on the temperature of the print region or parts of the print region as determined using the thermal sensor.

However, if the actual or current position of the thermal sensor differs from an expected position of the thermal sensor, the temperature distribution of the print region calculated using the thermal sensor may differ from the actual temperature distribution. For example, if the thermal sensor is offset from the expected position, the calculated temperature distribution may also be offset from the actual temperature distribution of the print region.

Examples described herein allow such a deviation in position of the thermal sensor from an expected position to be identified and the additive manufacturing system to be controlled appropriately. For example, the additive manufacturing system may be controlled at least in dependence on generated difference data which is indicative of a difference between a position of the thermal sensor during capture of an image of a print region and an expected position of the thermal sensor, for example with respect to the print region. The difference data may be based on a comparison between image data representative of a captured image of a pattern, which for example corresponds with a temperature distribution of at least a surface of a build material after application of at least one printing agent to the build material in accordance with the pattern and fusing of the build material, with data representative of an expected position of the pattern.

For example, where it is determined that the position of the thermal sensor does not significantly deviate from the expected position of the thermal sensor, a printing process may continue. Conversely, where it is determined that the position of the thermal sensor differs from the expected position of the thermal sensor by an amount greater than a threshold amount, the additive manufacturing system may be recalibrated appropriately, to compensate for this difference.

Examples described herein may be carried out as part of a startup routine of the additive manufacturing system, for example during the initial build sequence. The initial check on the position of the thermal sensor may be performed relatively quickly by forming a relatively small number of layers of a build material, printing patterns of printing agents on the respective layers of the build material and comparing images of the patterns with data representative of expected positions of the patterns. Then, based on this initial check, a determination can be made as to whether a calibration of the additive manufacturing system is needed, instead of performing a calibration process each time a new build is started, as a default. This can reduce the build material waste, print agent consumption and startup time. Furthermore, by providing for accurate calibration of the additive manufacturing system, the quality of the printed object may be higher due to the control of the subsystems relying on temperature information. In addition, by providing for appropriate calibration of the additive manufacturing system, examples may improve a user experience, for example by reducing the need for users to engage technical support to request assistance in improving the calibration of the additive manufacturing apparatus.

FIG. 1 shows a simplified schematic diagram of an additive manufacturing apparatus 100 according to an example. The additive manufacturing apparatus 100 in this example includes a 3D printer 102 coupled to a build unit 104.

According to an example, a 3D print operation includes depositing a layer of a build material onto a build platform of the build unit 104. The build platform may be considered to correspond to or include a print region 106 or working area. There are various different kinds of build materials from which a particular part or object may be built. The choice of build material may be made based on the desired properties of the part or object to be printed. In certain additive manufacturing systems, the build material may be changed between builds accordingly. For example, various plastic powder types can be used as the raw build material; for example, thermoplastics, such as polyamide (PA) 11, PA12, and thermoplastic polyurethane (TPU), etc. In other examples, metal powders may be used.

At least one printing agent is selectively deposited to contact the build material, in accordance with a pattern to be printed. As described above, the at least one printing agent may be a fusing agent and/or a detailing agent. Energy, such as heat (sometimes referred to as thermal energy), is applied to the print region to fuse the build material to form the pattern. The heat may be provided by one or more heating elements 108 to fuse the portions of the build material where the fusing agent has been applied. For example, the heating elements may irradiate a layer of build material with infrared radiation, visible radiation or ultraviolet radiation. The heating elements may be or include a laser beam, which can be directed to scan the surface of the build material (or the surface of the printing agent coating the build material) to selectively bind together powder particles of the build material. In some examples, during the print operation, the build material may be maintained at a temperature slightly below the fusing temperature of the build material so that the amount of energy supplied by the heating elements and absorbed by the fusing agent to fuse the build material is reduced.

The fusing of the build material for example results in a temperature distribution of at least a surface of the build material. After fusing, the build material may therefore have a temperature distribution or variation that corresponds with the pattern of the at least one printing agent that was deposited on the build material prior to application of energy. For example, after fusing, regions of the build material that were contacted by a fusing agent may correspond with higher temperature regions than other regions. Conversely, regions of the build material on which a detailing agent was deposited may correspond with lower temperature regions than other regions, after fusing.

In the example shown in FIG. 1, the build unit 104 is detachable from the 3D printer 102. In particular, the build unit 104 may be removed by an operator to perform a refill operation of the build unit 104. However, in other examples, the build unit 104 and the 3D printer 102 may be integral with each other.

The build unit 104 stores a supply of build material, for example, build powder. In one example a clean-up stage is performed on the build unit prior to a build powder fill operation. For example, in one case a clean-up stage includes a powder management station removing unused build material from the build unit and combining the unused build material with fresh build material for a further print operation. Unused build material may be recovered and recycled by a build powder management station, for instance, and mixed with virgin (or 'new') build material. Following a build powder fill operation, the operator may return the build unit 104 to the 3D printer 102 to perform further print operations.

The example additive manufacturing apparatus 100 of FIG. 1 also includes a thermal sensor 110. The thermal sensor 110 of FIG. 1 is located in the 3D printer 102 such that, with the build unit 104 inserted in the 3D printer 102, the thermal sensor 110 is capable of receiving radiation, such as near-infrared radiation or infrared radiation, from the surface of the build material in the build region 106. Based on the received radiation, the thermal sensor 110 may generate image data that indicates the temperature of the surface of the build material in the build region 106. The warmest parts of a thermal image may be indicated with a white color and the coolest parts of a thermal image may be indicated with a black color, with intermediate temperatures indicated in red and/or yellow colors (although other color scales are possible).

As explained above, the temperature of the surface of the build material in the build region 106 will generally depend on the fusing that has been applied to the build material. As some regions of the build material will generally have absorbed more or less energy than other regions of the build material, these regions will have a different temperature than the other regions. Therefore, the thermal image captured by the thermal sensor 110 may depend on the pattern of fusing of the build material. This can be exploited to determine or identify whether a position of the thermal sensor 110 is correctly calibrated, as will be explained further with reference to FIG. 2.

Figure 2:
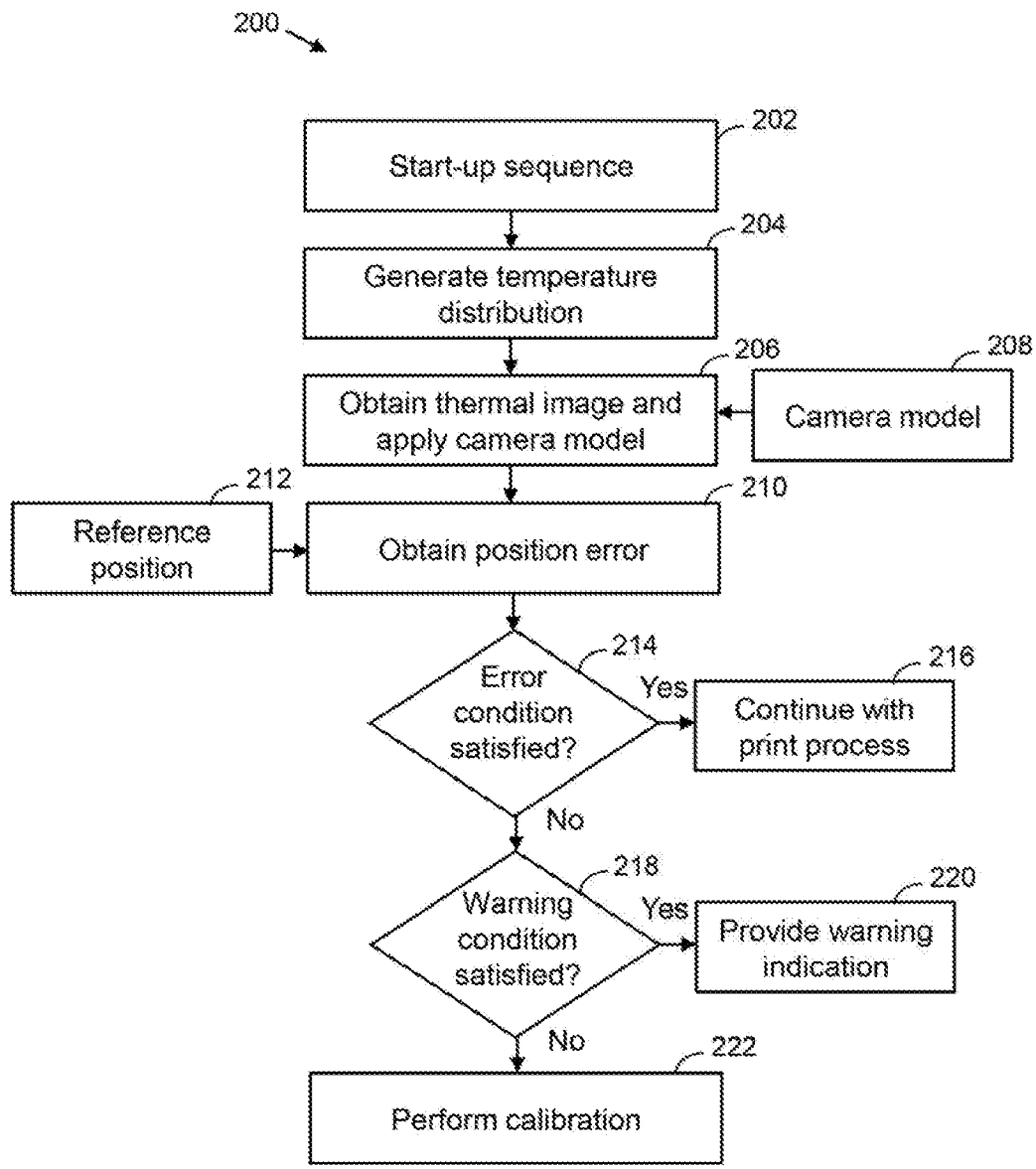
FIG. 2 is a flow diagram showing a method of controlling operation of an additive manufacturing system according to an example.

FIG. 2 is a flow diagram showing a method 200 of controlling operation of an additive manufacturing system, such as the additive manufacturing system 100 of FIG. 1, according to an example. A calibration of a thermal sensor of an additive manufacturing system may be performed during manufacture of the additive manufacturing system, for example prior to shipping or transportation of the additive manufacturing system to a customer or operator for use. However, the position of the thermal sensor may shift during transportation or installation of the additive manufacturing system, or during replacement of the sensor. The method 200 of FIG. 2 allows a shift or change in position of a thermal sensor of an additive manufacturing system from a nominal or expected position to be identified.

At block 202 of the method 200 of FIG. 2, the start-up sequence of an additive manufacturing system is initiated. The start-up sequence in this case corresponds with a set or series of commands that are carried out when the additive manufacturing system receives instructions indicating that an object is to be printed, and may include further commands than those shown in FIG. 2. For example, the start-up sequence may be initiated when the build unit 104 is inserted into the 3D printer 102 for printing of a new object or when the additive manufacturing system receives a print command, for example from a user or from a client device such as a computer system coupled to the additive manufacturing system.

In the example of FIG. 2, the initiation of the start-up routine triggers the subsequent elements of the method 200 of FIG. 2, so that the method 200 of FIG. 2 is performed upon starting to print an object using the additive manufacturing system. In this way, the calibration of the position of the thermal sensor can be verified before printing of a desired output object begins, reducing wastage or a reduction in printed object quality that may occur if an object is printed with an incorrectly calibrated thermal sensor. However, in other examples, the method 200 of FIG. 2 may be performed at other times, for example in response to a user input or at scheduled times. In such cases, the method 200 of FIG. 2 may or may not also be performed upon starting to print a new object with the additive manufacturing system 100.

At block 204, a temperature distribution of at least a surface of a build material is generated. This may involve supplying a build material to a print region of the additive manufacturing system. At least one printing agent, such as a fusing agent or a detailing agent may be selectively deposited, in accordance with a pattern, to contact the build material, and energy may be applied to the print region to fuse the build material so as to produce the temperature distribution, which in examples corresponds with the pattern of the at least one printing agent. The deposition of the build material, the at least one printing agent and the fusing of the build material in accordance with the pattern of the at least one printing agent may be considered to correspond to a printing of the pattern. The thermal contrast of the build material after fusing, based on the location of the deposited printing agent and on the application of energy to the bed area, corresponds to the pattern in examples.

The pattern may correspond to any arrangement, design or structure of one or more layers of build material. The pattern may be a repeating pattern or a non-repeating pattern. Symmetric, uniform or regular or asymmetric, non-uniform or irregular patterns are possible. For example, the pattern may be a relatively simple pattern, such as a predetermined or preconfigured pattern for the purposes of verifying the alignment of the thermal sensor with the build region. A simple pattern, for example of at least one printing agent onto a surface of the build material, may be printed with a reduced quantity of the print agent and, consequently, a reduced time needed for the verification of the positon of the thermal sensor compared with the printing of a more complex pattern.

In other examples, the method may include receiving print job data corresponding to an output object to be printed by the additive manufacturing system and printing a pattern corresponding to a pattern of at least one layer of the output object. For example, the method 200 of FIG. 2 may include printing the first or lowermost layer or layers of the output object as the pattern. In this way, the printing of the output object can continue after the method 200 of FIG. 2 has been carried out, by printing layers subsequent to the layers corresponding to those printed as part of the method 200 of FIG. 2. In other words, the first layer or layers of the output object can be used for the verification of the position of the thermal sensor and also as part of the output object itself (if the thermal sensor position is determined to be correct or tolerable by the method 200 of FIG. 2).

A plurality of layers of a build material may be supplied. For example, between 1 layer and 10 layers of the build material, for example between 5 layers and 10 layers of the build material, may be supplied. In such cases, at least one printing agent may be applied in turn to each individual layer of the build material and each layer of build material may be fused in turn. Thus, in these examples, the temperature distribution may be of a plurality of layers of the build material rather than of a single layer of build material. In examples in which the temperature distribution is of a plurality of layers of the build material, and for example represents a cumulative heat effect of fused portions of each of the plurality of layers of the build material, the position of the thermal sensor may be determined more accurately than a pattern with fewer layers, in which the temperature distribution is less complex or less distinctive. However, by depositing more layers of build material, the time taken to perform the verification of the thermal sensor position will correspondingly increase, as each layer for example takes a fixed or constant amount of time to deposit and fuse. Thus, supplying and fusing between 1 layer and 10 layers of the build material may provide an appropriate balance between accuracy and time taken.

At block 206 of FIG. 2, a thermal image of the pattern is obtained using the thermal sensor. A suitable thermal sensor for obtaining the thermal image is a thermopile sensor from Heimann Sensor GmbH, Maria-Reiche-Str. 1, D-01109 Dresden, Germany, such as the HTPA 32×31 sensor. The capturing of the image of the pattern for example includes detecting, using the thermal sensor, the temperature distribution of the fused build material and generating the image of the pattern based on the detected temperature distribution of the fused build material. Suitable thermal sensors may have a relatively low resolution but nevertheless are able to sense the temperature distribution sufficiently accurately. For example, the HTPA 32×31 sensor has a resolution of 32 by 31 pixels. In examples, the pattern according to which the at least one printing agent is applied to the build material may be selected such that the size of features of the temperature distribution (such as temperature differences between neighbouring pixels) detectable by the thermal sensor is equal to or larger than the size of pixels of the thermal sensor. This allows such features to be detected by the thermal sensor.

A camera model 208 is applied to the thermal image of the pattern. The camera model 208 for example provides a mapping between pixels of an image captured by the thermal sensor and locations in an image plane of the image. Thus, the camera model can be used to associate features of the pattern as captured by the thermal sensor, such as bright (e.g. hot) or dark (e.g. cold) pixels or pixel regions, with corresponding locations, co-ordinates, points or areas in the image plane. For example, the camera model can be used to determine which locations on the surface of the build material in the build region correspond with hot or cold pixels of the thermal image sensed by the thermal sensor.

At block 210 of FIG. 2 a position error 210 is obtained using reference position data 212. The position error 210 for example indicates the deviation of a position of the thermal sensor during capture of the image of the pattern from an expected position of the thermal sensor. For example, the position error 210 may be obtained by comparing image data representative of the captured image of the pattern with data representative of an expected position of the pattern, which may correspond with the reference position data 212. On the basis of the comparing, the position error 210 may be calculated, which may be represented by difference data.

For example, where the reference position data 212 represents an expected position of the pattern associated with the expected position of the thermal sensor, use of the camera model 208 in conjunction with the image data representing the captured image of the pattern can be used to calculate a shift in position of the camera with respect to the print region (which may correspond with the image plane, as the image is a thermal image of the surface of the build material in the print region). For example, by comparing the expected position of the pattern with the actual position of the pattern, a shift or other transformation of the thermal sensor from the expected position can be calculated.

In methods such as that of FIG. 2, the operation of the additive manufacturing system can be controlled at least in dependence on the generated difference data. FIG. 2 shows one example of control of the operation of the additive manufacturing system, although other control methods are possible in other examples.

The example method 200 of FIG. 2 includes, at block 214, determining if an error condition is satisfied. This determining may include determining whether the difference data satisfies a difference condition. The difference condition is for example satisfied in cases where the position of the thermal sensor is determined to be sufficiently close to the expected position of the thermal sensor for the additive manufacturing apparatus to operate within expected or tolerable quality parameters. For example, the difference condition may be satisfied if the position of the thermal sensor is calculated to be within 2 millimeters (mm) of the expected position or if the difference between the position of the pattern based on the captured image and the expected position of the pattern is determined to correspond to a difference of less than or equal to 0.17 Heimann pixels (where a Heimann thermopile sensor is used as the thermal sensor). If it is determined that the difference data satisfies the difference condition, the additive manufacturing system in the example of FIG. 2 is controlled to print an output object based on received print job data. In other words, as illustrated at block 216 of FIG. 2, the print process can begin to print the output object without performing a calibration of the thermal sensor.

If, however, the difference data does not satisfy the difference condition, at block 218 of FIG. 2, it is determined whether the difference data satisfies a warning condition. The warning condition for example corresponds with a threshold error of 2 mm, which may correspond with a relatively large error or deviation in the position of the thermal sensor from the expected position. For example, the threshold error may correspond with an error that may lead to poorer part quality. If the difference data indicates that the calculated difference between the position of the thermal sensor and the expected position of the thermal sensor exceeds the threshold error, a warning indication 220 is provided. The warning indication is for example a warning message presented on a display of the additive manufacturing system or a warning noise or other warning communication for example to a user of the additive manufacturing system. By warning the user of the additive manufacturing system, the user can for example calibrate the thermal sensor using an alternative method or override the warning and continue printing, despite the potential reduction in object quality associated with an incorrectly calibrated additive manufacturing system.

If the difference data does not satisfy the warning condition, a calibration process is performed at block 218 in the method of FIG. 2. The calibration process in examples such as FIG. 2 involves altering parameters of the additive manufacturing system appropriately to compensate for the difference between the position of the thermal sensor and the expected position of the thermal sensor.

In examples, the additive manufacturing system may be calibrated using the difference data. For example, as the difference data is indicative of the deviation of the thermal sensor from an expected position, this deviation can be received as an input to the control system for controlling the additive manufacturing system and taken into account when associating the position of locations in the build region with respective pixels of an image captured using the thermal sensor. For example, if the position of the thermal sensor is calculated to be shifted with respect to the build region, it can be determined that pixels of images captured by the thermal sensor will correspond to a shifted location in the build region rather than the expected location based on the camera model. The camera model itself may therefore be updated accordingly to account for this shift, to correctly map image pixels for images captured by the thermal sensor to locations in the build region.

Figure 3:
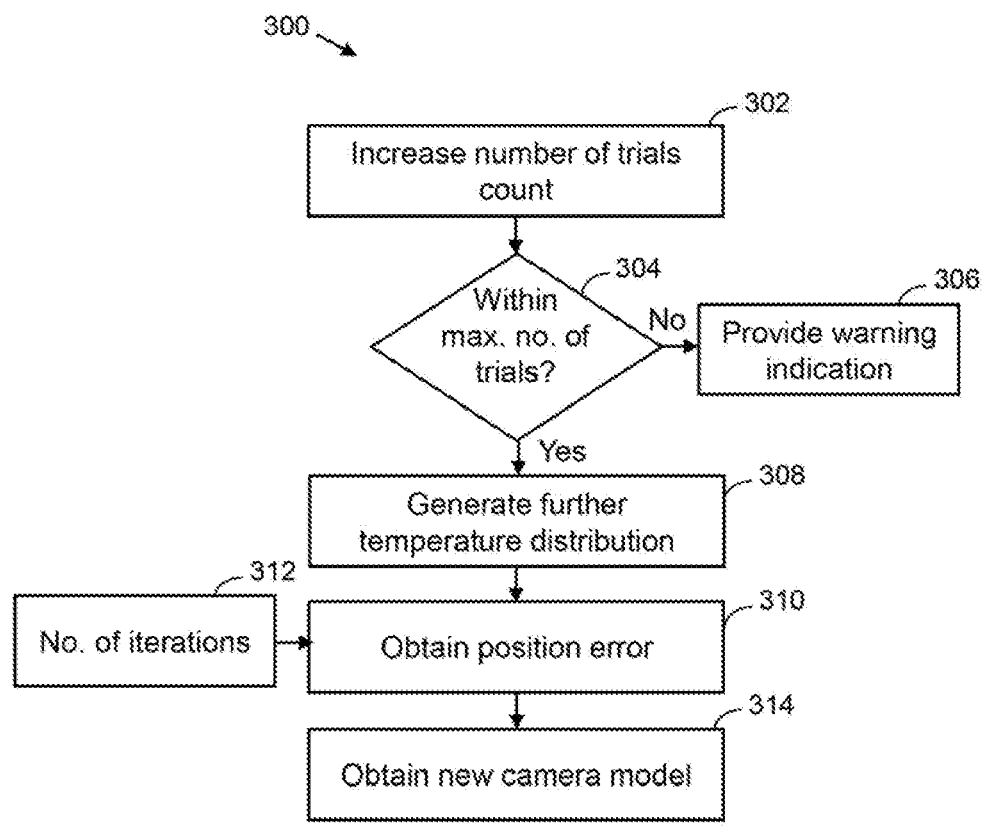
FIG. 3 is a flow diagram showing an example method of calibrating an additive manufacturing system.

FIG. 3 is a flow diagram showing a further example method 300 of calibration of an additive manufacturing system such as the additive manufacturing system 100 of FIG. 1. The method 300 of FIG. 3 can be used in response to determining that a difference condition is not satisfied, for example as described with reference to FIG. 2.

In the example method 300 of FIG. 3, the number of trials count is increased at block 302. This is because the method 200 of FIG. 2 of checking the calibration of the thermal sensor and the method 300 of FIG. 3 of recalibrating the thermal sensor may be carried out a plurality of times, with the number of trials count representative of the number of iterations of the methods 200, 300 of FIGS. 2 and 3.

At block 304 it is determined whether the number of trials count is within, for example less than or equal to, a maximum number of trials. If the number of trials count exceeds the maximum number of trials, a warning indication is provided at block 306, which may be similar to the warning indication of block 220 of FIG. 2. For example, if this is the case, this may indicate that the position of the thermal sensor is very different from the expected position of the thermal sensor, in which case a different calibration process may be performed to compensate for this.

Although the example method 300 of FIG. 3 includes the checking of the number of trials, this checking may be absent in other example methods. For example, another example method may include blocks 308, 310, 312 and 314 of FIG. 3 (described below) but not blocks 302, 304 and 306.

At block 308 of FIG. 3, a further temperature distribution of at least a surface of a further build material, the further temperature distribution corresponding to a further pattern, is generated. For example, the further temperature distribution may be generated similarly to the generation of the temperature distribution described above. For example, further build material, which may be the same as or different from the build material, is supplied to the print region of the additive manufacturing system. The further temperature distribution may be generated by depositing, in accordance with the further pattern, at least one printing agent to contact the further build material, and subsequently applying energy to the print region to fuse the further build material in accordance with the further pattern.

The further pattern may be the same as the pattern or may be different from the pattern. For example, the further pattern may be more complex than the pattern. A more complex further pattern may include less uniformity or an increased number of distinct or separate fused elements of build material. The further pattern may be a further predetermined pattern with a complexity selected or optimized for accurately determining the deviation of the position of the thermal sensor from the expected position.

At block 310 of FIG. 3, the position error of the thermal sensor is calculated. The calculation of the position error of the thermal sensor may be similar to calculation of the position error described with respect to blocks 206, 208, 210 and 212 of FIG. 2. For example, an image of the further pattern may be captured using the thermal sensor. Further image data representative of the captured image of the further pattern may be compared with further data representative of the expected position of the further pattern to generate the further difference data, which may represent the position error obtained at block 310 of FIG. 3. As will be appreciated by the skilled person, in other examples, the further difference data may be calculated using other methods, for example based on further processing of the difference data or based on data from other sources.

In the example of FIG. 3, the additive manufacturing system is calibrated to compensate for the difference between the position of the thermal sensor and the expected position of the thermal sensor using the further difference data, although in other examples the additive manufacturing system may be calibrated using both the difference data and the further data.

The calibration may include a plurality of iterations. This is illustrated at block 312 of FIG. 3. For example, a plurality of layers of the further build material may be deposited and fused based on further pattern, for example by supplying energy to the print region after deposition of at least one printing agent (in accordance with the further pattern) to contact the further build material. The position error may be calculated separately for each layer or set of layers. The position error used for the calibration may then be obtained by combining this plurality of position errors by any suitable combination method, such as an average. However, in other examples, there may be one iteration, with the position error obtained after printing the plurality of layers of the further build material.

At block 314 of FIG. 3 a new camera model 314 is obtained, for mapping pixels of images captured by the thermal sensor with locations in the print region. The method of FIG. 2 may then be performed again to verify that the updated camera model 314 adequately compensates for the position of the thermal sensor. When the method of FIG. 2 is performed again, the camera model of block 208 of FIG. 2 may be replaced with the new camera model of block 314 of FIG. 3.

Figure 4:
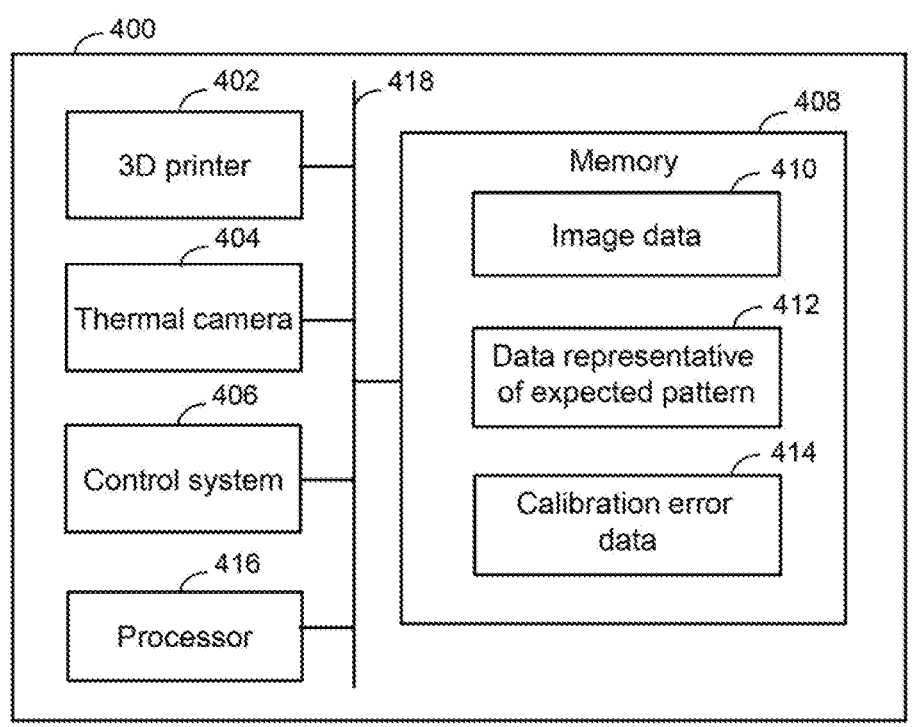
FIG. 4 is a schematic block diagram of a three-dimensional (3D) printing system according to an example.

FIG. 4 illustrates schematically a three-dimensional (3D) printing system 400. The 3D printing system 400 of FIG. 4 is similar to the additive manufacturing system 100 of FIG. 1 but with additional components illustrated. The 3D printing system 400 of FIG. 4 includes a 3D printer 402 and a thermal camera 404 for obtaining images of print outputs printed by the 3D printer 402, which may be similar to the thermal sensor 110 of FIG. 1.

The example 3D printing system 400 of FIG. 4 also includes a control system 406. The control system 406 may be arranged to control the 3D printing system 400 in accordance with any of the examples described herein. For example, the control system 406 may be arranged to receive an image, from the thermal camera 404, of a temperature distribution of a fused build material printed using the 3D printer 402, the temperature distribution corresponding to a pattern, and to generate a comparison between the pattern and an expected pattern. The control system 406 may be further arranged to determine, on the basis of the comparison, a difference between a position of the thermal camera 404 during obtaining the image of the pattern and an expected position of the thermal camera 404 associated with the expected pattern and control the 3D printer 402 on the basis of the determined difference. For example, the control system 406 may be arranged to, in dependence on determining that the difference data fails to satisfy a difference condition, calibrate the 3D printing system 400 to compensate for the difference between the position of the thermal camera 404 and the expected position of the thermal camera 404.

The control system 406 may receive data from a memory 408. The memory 408 may include at least one of volatile memory, such as a random access memory (RAM) and non-volatile memory, such as read-only memory (ROM) or a solid state drive (SSD) such as Flash memory. The memory 408 in examples may include further storage devices, for example magnetic, optical or tape media, compact disc (CD), digital versatile disc (DVD) or other data storage media. The memory 408 may be removable or non-removable from the 3D printing system 400. The 3D printer 402 may include the memory 408.

In the example of FIG. 4, the memory 408 includes image data 410 representing an image captured by the thermal camera 404 of the temperature distribution of the fused build material by the 3D printer 402, which for example corresponds with a pattern. The memory 408 also includes data representative of the expected pattern 412, for example data representative of an image of an expected pattern corresponding to a temperature distribution of the fused build material as would be obtained with the thermal camera 404 in an expected position. The memory 408 further includes calibration error data 414 which is representative of a calibration error indicative of a difference between a current position of the thermal camera 404 and the expected position of the thermal camera 404. The control system 406 may use the data of the memory 408 to control the operation of the 3D printing system 400.

In the example of FIG. 4, the 3D printing system 400 further includes a processor 416, which is communicatively coupled to the memory 408. The processor 416 in FIG. 4 may be a microprocessor, a general purpose processor, a digital signal processor (DSP), an application specific integrated circuit (ASIC), a field programmable gate array (FPGA) or other programmable logic device, a discrete gate or transistor logic, discrete hardware components, or any suitable combination thereof designed to perform the functions described herein. A processor may also be implemented as a combination of computing devices, e.g., a combination of a DSP and a microprocessor, a plurality of microprocessors, one or more microprocessors in conjunction with a DSP core, or any other such configuration. The components of the 3D printing system 400 in the example of FIG. 4 are interconnected using a systems bus 418. This allows data to be transferred between the various components.

Figure 5:
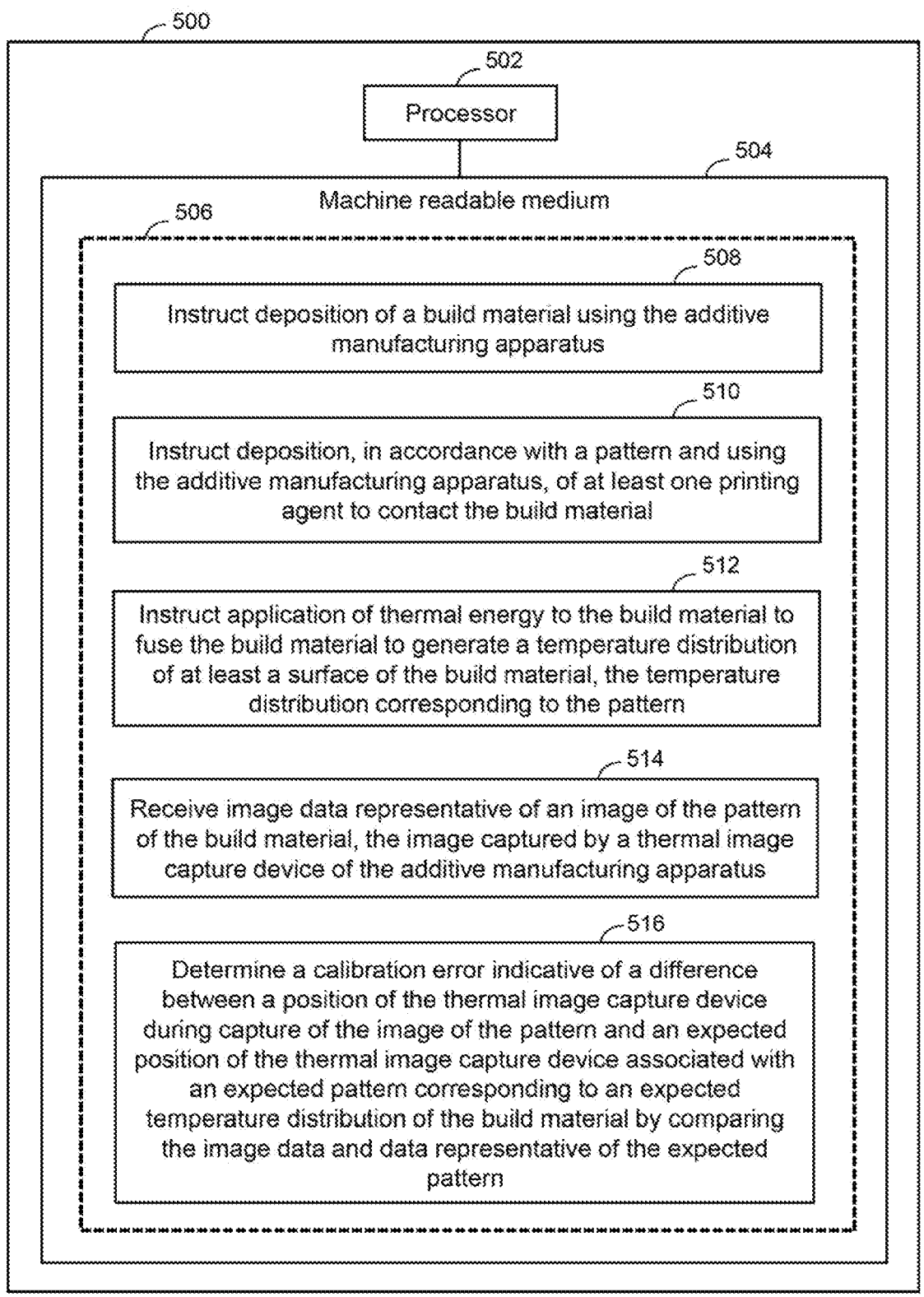
FIG. 5 is a schematic illustration of a processing device according to an example.

Certain system components and methods described herein may be implemented by way of machine-readable instructions that are storable on a non-transitory storage medium. FIG. 5 shows an example of a three-dimensional printing system or device 500 comprising at least one processor 502 arranged to retrieve data from a computer-readable storage medium 504. The computer-readable storage medium 504 comprises a set of computer-readable instructions 506 stored thereon. The at least one processor 502 is configured to load the instructions 506 into memory for processing. The instructions 506 are arranged to cause the at least one processor 502 to perform a series of actions.

Instruction 508 is configured to cause the processor 502 to instruct deposition of a build material using the additive manufacturing apparatus.

Instruction 510 is configured to cause the processor 502 to instruct deposition, in accordance with a pattern and using the additive manufacturing apparatus, of at least one printing agent to contact the build material.

Instruction 512 is configured to cause the processor 502 to instruct application of thermal energy to the build material to fuse the build material to generate a temperature distribution of at least a surface of the build material, the temperature distribution corresponding to the pattern.

Instruction 514 is configured to cause the processor 502 to receive image data representative of an image of the pattern, the image captured by a thermal image capture device of the additive manufacturing apparatus.

Instruction 516 is then configured to cause the processer 502 to determine a calibration error indicative of a difference between a position of the thermal image capture device during capture of the image of the pattern and an expected position of the thermal image capture device associated with an expected pattern corresponding to an expected temperature distribution of at least the surface of the build material by comparing the image data and data representative of the expected pattern of the build material.

The non-transitory storage medium can be any media that can contain, store, or maintain programs and data for use by or in connection with an instruction execution system. Machine-readable media can comprise any one of many physical media such as, for example, electronic, magnetic, optical, electromagnetic, or semiconductor media. More specific examples of suitable machine-readable media include, but are not limited to, a hard drive, a random access memory (RAM), a read-only memory (ROM), an erasable programmable read-only memory, or a portable disc.

The preceding description has been presented to illustrate and describe examples of the principles described. This description is not intended to be exhaustive or to limit these principles to any precise form disclosed. Many modifications and variations are possible in light of the above teaching. For example, FIGS. 2 and 3 include various checks regarding whether certain conditions are satisfied. In other examples, though, one or more of these checks may be omitted.

It is to be understood that any feature described in relation to any one example may be used alone, or in combination with other features described, and may also be used in combination with any features of any other of the examples, or any combination of any other of the examples.

What is claimed is:

1. A method of operating an additive manufacturing system, the method comprising:
    supplying a build material to a print region of the additive manufacturing system;
    generating, using the additive manufacturing system, a temperature distribution of at least a surface of the build material, the temperature distribution corresponding to a pattern;
    capturing an image of the pattern using a thermal sensor of the additive manufacturing system;
    comparing image data representative of the captured image of the pattern with data representative of an expected position of the pattern;
    on the basis of the comparing, generating difference data indicative of a difference between:
        a position of the thermal sensor during capture of the image of the pattern; and
        an expected position of the thermal sensor associated with the expected position of the pattern; and
    controlling operation of the additive manufacturing system in dependence on the generated difference data to produce an object by additive manufacturing according to instructions received by the additive manufacturing system.

2. The method of claim 1, comprising:
    determining that the difference data satisfies a difference condition,
    wherein controlling the operation of the additive manufacturing system comprises, in dependence on determining that the difference data satisfies the difference condition, printing an output object based on received print job data.

3. The method of claim 1, comprising:
    determining that the difference data fails to satisfy a difference condition,
    wherein controlling the operation of the additive manufacturing system comprises calibrating the additive manufacturing system to compensate for the difference between the position of the thermal sensor and the expected position of the thermal sensor.

4. The method of claim 3, wherein calibrating the additive manufacturing system comprises calibrating the additive manufacturing system using the difference data.

5. The method of claim 3, wherein calibrating the additive manufacturing system comprises:
    generating further difference data further indicative of the difference between the position of the thermal sensor and the expected position of the thermal sensor; and
    calibrating the additive manufacturing system using the further difference data.

6. The method of claim 5, wherein generating the further difference data comprises:
    supplying further build material to the print region of the additive manufacturing system;
    generating, using the additive manufacturing system, a further temperature distribution of at least a surface of the further build material, the further temperature distribution corresponding to a further pattern;
    capturing an image of the further pattern using the thermal sensor;
    comparing further image data representative of the captured image of the further pattern with further data representative of an expected position of the further pattern; and
    on the basis of the comparing, generating the further difference data.

7. The method of claim 1, wherein generating the temperature distribution comprises:
    selectively depositing, in accordance with the pattern, at least one printing agent to contact the build material.

8. The method of claim 7, further comprising applying energy to the deposited printing agent, wherein the applied energy is thermal energy.

9. The method of claim 1, comprising receiving print job data corresponding to the object, wherein the pattern corresponds to a pattern of at least one layer of the object.

10. The method of claim 1, further comprising iterating the generating of the temperature distribution corresponding to a pattern, capturing an image, comparing the captured image to the expected position of the pattern, and generating difference data in up to 10 layers of a build material.

11. The method of claim 1, wherein the temperature distribution is of a plurality of layers of the build material.

12. The method of claim 1, comprising determining that the difference data satisfies a warning condition,
wherein controlling the operation of the additive manufacturing system comprises, in dependence on determining that the difference data satisfies the warning condition, providing a warning indication.

13. A three-dimensional (3D) printing system comprising:
a 3D printer;
a thermal camera for obtaining an image of a temperature distribution of a fused build material printed by the 3D printer; and
a control system arranged to:
receive an image, from the thermal camera, of the temperature distribution of the fused build material printed using the 3D printer, the temperature distribution corresponding to a pattern;
generate a comparison between the pattern and an expected pattern;
determine, on the basis of the comparison, a difference between:
a position of the thermal camera during obtaining the image of the printed pattern; and
an expected position of the thermal camera associated with the expected pattern; and
control the 3D printer on the basis of the determined difference.

14. The 3D printing system of claim 13, wherein the control system is arranged to, in dependence on determining that the difference data fails to satisfy a difference condition, calibrate the 3D printing system to compensate for the difference between the position of the thermal camera and the expected position of the thermal camera.

15. A non-transitory machine-readable medium comprising instructions which, when executed by a processor of an additive manufacturing apparatus, cause the processor to:
instruct deposition of a build material using the additive manufacturing apparatus;
instruct deposition, in accordance with a pattern and using the additive manufacturing apparatus, of at least one printing agent to contact the build material;
instruct application of thermal energy to the build material to fuse the build material to generate a temperature distribution of at least a surface of the build material, the temperature distribution corresponding to the pattern;
receive image data representative of an image of the pattern, the image captured by a thermal image capture device of the additive manufacturing apparatus;
determine a calibration error indicative of a difference between:
a position of the thermal image capture device during capture of the image of the pattern; and
an expected position of the thermal image capture device associated with an expected pattern corresponding to an expected temperature distribution of at least the surface of the build material, by comparing the image data and data representative of the expected pattern; and
calibrate the additive manufacturing apparatus using the determined calibration error.

16. The method of claim 1, wherein controlling operation of the additive manufacturing system in dependence on the generated difference data further comprises, while forming the object, compensating for a shift in position of the thermal sensor away from an expected position of the thermal sensor.

17. The method of claim 16, further comprising, when the difference data indicates a shift in position of the thermal sensor from the expected position by more than a threshold error, presenting a warning message that a user should calibrate the thermal sensor.

18. The method of claim 1, further comprising:
iterating the generating of the temperature distribution corresponding to a pattern, capturing an image, comparing the captured image to the expected position of the pattern, and generating difference data multiple times up to a predetermined number of trials; and
when the number of trials exceeds, the predetermined number of trials, presenting a warning message that a user should use a different calibration process to compensate for the difference in the position of the thermal sensor.

19. The method of claim 7, further comprising:
applying energy to the print region to fuse the build material to generate the temperature distribution,
wherein capturing the image of the pattern comprises:
detecting, using the thermal sensor, the temperature distribution of the fused build material; and
generating the image of the pattern based on the detected temperature distribution of the fused build material.

20. The method of claim 11, wherein the image of the pattern is an average of the thermal distribution in the plurality of layers of build material.

* * * * *